United States Patent [19]

Hasselberg et al.

[11] Patent Number: 5,765,668
[45] Date of Patent: Jun. 16, 1998

[54] FALL PROTECTION DEVICE FOR ACTUATORS

[75] Inventors: Pär-Olof Hasselberg, Kållered; Dag Arne Olofsson, Mölndal, both of Sweden

[73] Assignee: SKF Specialty Products AB, Gothenburg, Sweden

[21] Appl. No.: 628,651

[22] PCT Filed: Oct. 15, 1993

[86] PCT No.: PCT/SE93/00842

§ 371 Date: Apr. 10, 1996

§ 102(e) Date: Apr. 10, 1996

[87] PCT Pub. No.: WO95/10716

PCT Pub. Date: Apr. 20, 1995

[51] Int. Cl.[6] .................. B66F 3/08; F16H 25/20
[52] U.S. Cl. .................... 192/7; 188/134; 192/144
[58] Field of Search .................. 192/7, 8 R, 8 A, 192/144, 147, 103 C; 188/134, 135; 74/424.8 B, 411.5

[56] References Cited

U.S. PATENT DOCUMENTS

| | | | |
|---|---|---|---|
| 2,008,403 | 7/1935 | Rockwell | 188/134 |
| 2,847,869 | 8/1958 | Hogan et al. | 188/134 X |
| 3,327,826 | 6/1967 | Henschke | 192/144 X |
| 3,449,978 | 6/1969 | Stimpson | 188/134 X |
| 3,536,169 | 10/1970 | Arnold | 192/8 R X |
| 3,587,796 | 6/1971 | Nestvogel | 192/8 R |
| 4,319,738 | 3/1982 | Nussbaum | . |
| 4,346,793 | 8/1982 | Fuse et al. | . |
| 4,524,851 | 6/1985 | Sawano et al. | 188/134 |
| 4,635,491 | 1/1987 | Yamano et al. | 74/411.5 X |

Primary Examiner—Rodey H. Bonck
Attorney, Agent, or Firm—Burns, Doane, Swecker & Mathis, L.L.P.

[57] ABSTRACT

A drop protection device for actuator devices of the type which are intended to raise and lower a load. The drop protection device includes a sleeve shaped member which, during normal operation of the actuator rotates along with a threaded spindle of the actuator. During rapid acceleration of the spindle, such as that experienced when the drive gear breaks down and the spindle rotates freely so as to cause the load to uncontrollably drop, the sleeve shaped member will, as a result of its mass inertia, be brought into contact with a stop device for preventing further rotation of the spindle. Thus, the drop protection device prevents the load from being damaged or causing damage to peripheral equipment or individuals.

9 Claims, 3 Drawing Sheets

FALL PROTECTION DEVICE FOR ACTUATORS

The present invention refers to a drop protection device at actuator devices, of the type intended to displace a load linearly. Actuator devices since long time constitute a well tested mechanical component, which is used to convert rotational motion into linear motion. Its main parts is a drive motor, the power of which via a gear is transferred to a spindle or a screw provided with a screw thread, which cooperates with a ball nut or a slide nut with a low degree of self-braking, which nut at rotation of the screw will be displaced axially along this.

Actuator devices of this type are used in a great number of applications such as for raising and lowering a load resting thereon or suspended therefrom. In many such cases it is important that the load is not allowed to drop uncontrolled, if, for example a breakdown in the gear would occur, whereby the spindle might rotate freely. Even if this is rare, very serious consequences would be the result if the falling load is constituted by goods which at a drop might be damaged or itself could cause damage to peripheral equipment and staff. For example a field of application where the damage risk is obvious at rapid, uncontrolled drop of the load, is in the field of nursing, where such vertically or almost vertically mounted actuator devices frequently are used in patient lifts of different types.

The purpose of the invention is to provide a drop protection device, by means of which the risk that such free drops might happen is eliminated.

In the following the invention will be further described with reference to two embodiments shown in the accompanying drawings.

Figure 1:
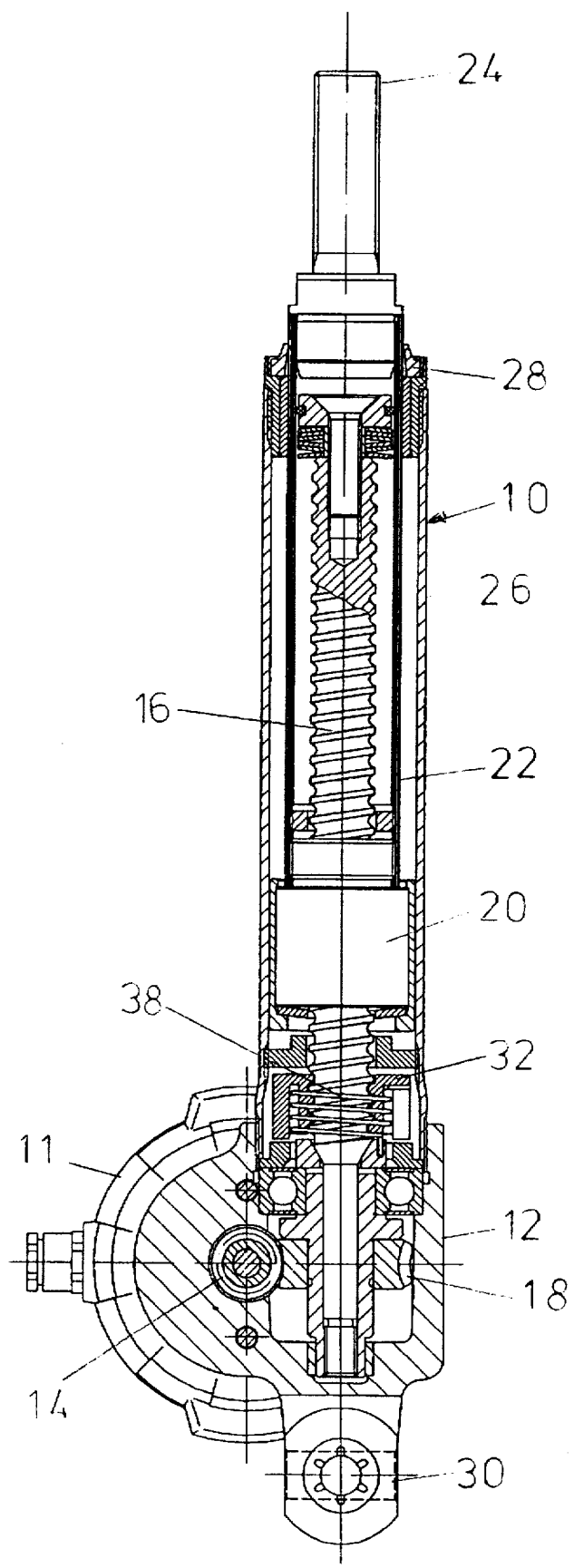
FIG. 1 shows in section an actuator device with a drop protection device according to the invention.
Figure 2:
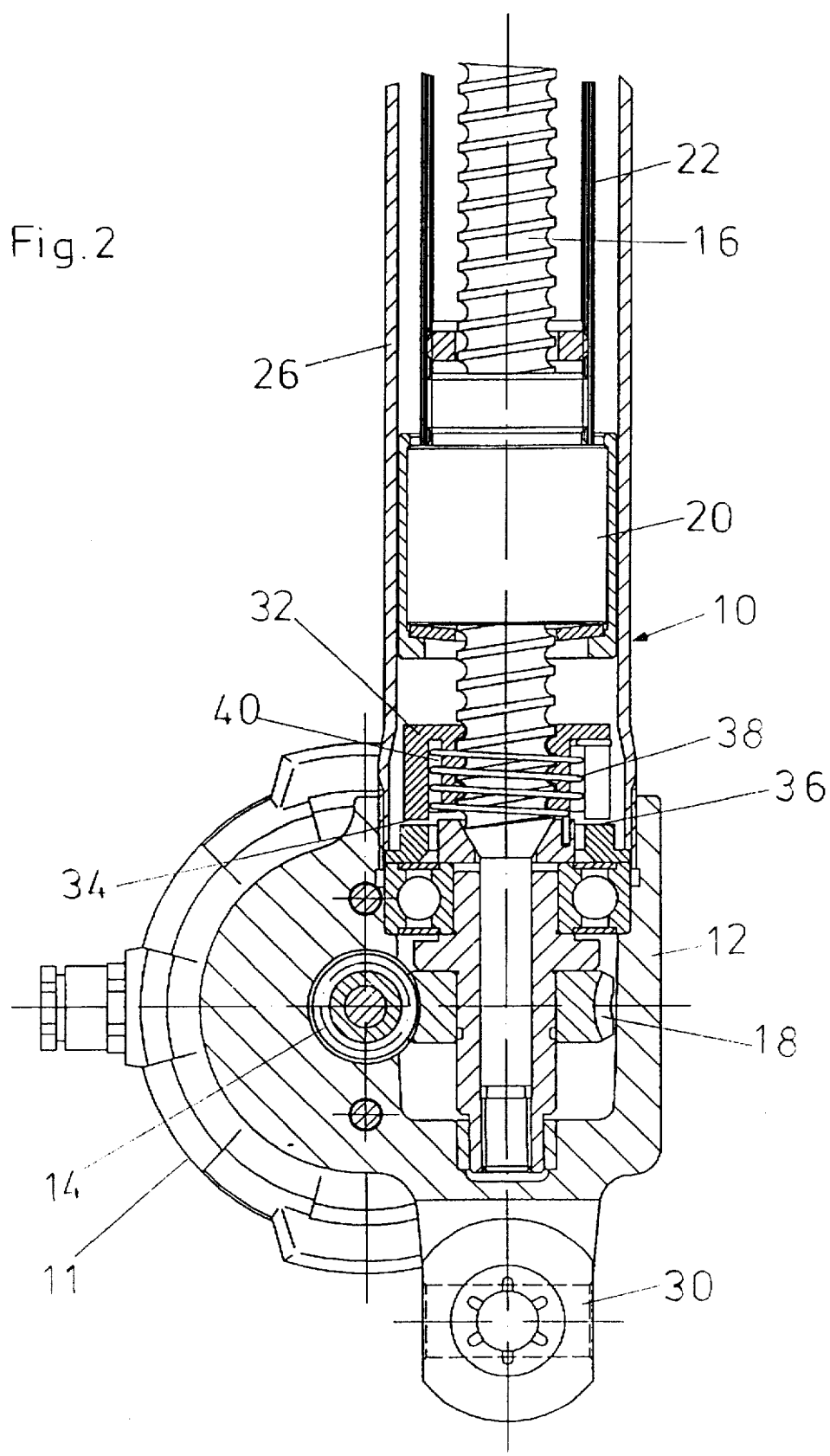
FIG. 2 shows in larger scale a portion of the actuator device with a drop protection device according to FIG. 1.

The actuator device 10 shown in FIGS. 1 and 2 incorporates an electric motor 11 connected to a gear housing 12, containing a worm-gear, which via a worm-screw 14, provided on the motor shaft, transfers rotation to a spindle 16 provided with threads along a major part of its length and journalled in the housing 12, via a worm-wheel 18 fitted on the spindle. The threaded part of the spindle or the screw 16 is provided with a first nut 20 arranged thereon, in the embodiment shown, a ball nut 20, which has very low friction and which at rotation of the screw is displaced axially along this. Fitted to the nut 20 is an actuator tube 22, which surrounds and encases the screw 16, and which by displacement of the ball nut along the screw is brought to project different distances beyond the screw end. The actuator tube 22 at its free end 24 is intended to be interconnected with a not shown forward or upper attachment, intended to carry the load or a support, which supports this load. The screw 16, the ball nut 20 and at least a part of the actuator tube 22 is enclosed in a protecting tube 26 attached to the housing 12, which protects the screw and by means of seals 28 prevents contaminations from reaching the surface of the screw. The gear housing 12 has a rear or lower attachment 30.

If for example, such an actuator device which is mounted vertically or almost vertically and supports a. load, should be exposed to a breakdown in the worm-gear, the screw 16, under actuation of the load, would be brought into a very rapid rotation, and fragile goods, patients and others handled by the actuator device, will be injured or damaged by the motion resulting from this, which can be regarded as equal to free fall.

For preventing this the screw 16, in accordance with the invention, at the proximity of its end facing the gear housing 12 is provided with a sleeve shaped member, in the embodiment shown in the shape of a second nut 32 provided with an annular contact surface 34 facing the gear housing. This second nut 32 is arranged to follow the normal rotation of the screw. At the rapid acceleration, to which the screw is subjected at sudden breakdown of the worm-gear, whereby the first nut 20 under influence of the supported load is lowered drop-like, the second nut 32, as a result of its mass inertia, will not be able to follow in the accelerated rotation of the screw, which means that the second nut will be screwed downwards until its contact surface 34 comes to engagement against a fixed stop device 36 in the gear housing, which means that the rotation of the screw and thereby the axial displacement of the first nut is stopped immediately.

In order to ensure that the second nut or the fall protection nut 32 at normal operational conditions will not come to engagement with its contact surface against the stationary stop device in the gear housing, the second nut 32 is pretensioned in direction from the gear housing by means of a spring 38, which in the embodiment shown is provided in a concentric, annular slot 40 of the nut.

Apart from that this spring in this manner ascertains that the fall protection nut 32 and the stop device 36 are kept spaced apart when the actuator device operates in a normal way, it also ensures that the fall protection nut 32 can not begin to be screwed in a direction away from the stop device 36 as a result of being carried along, e.g. due to contaminations, which possibly might have been able to enter between the fall protection nut and the protecting tube.

Figure 3:
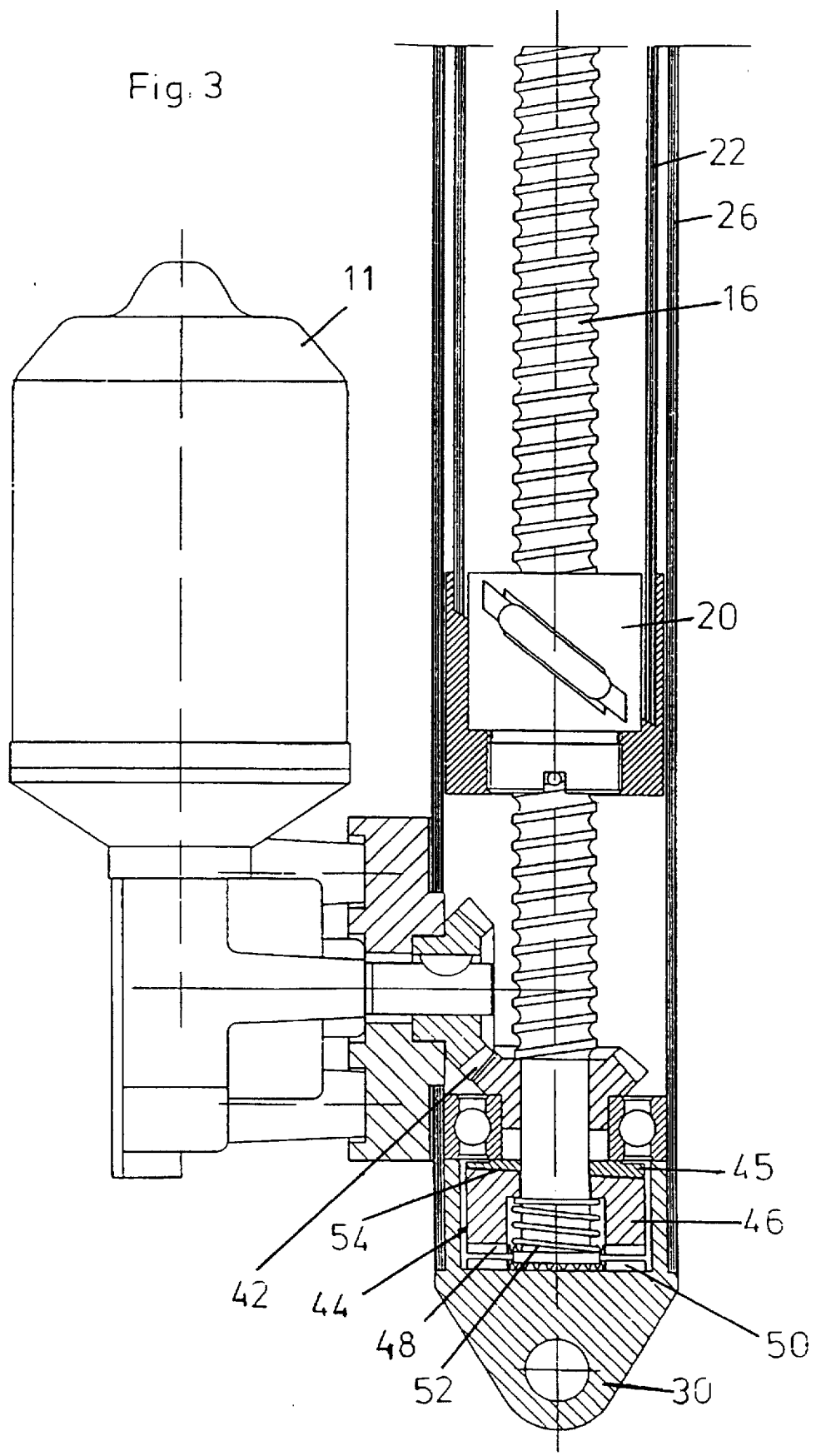
FIG. 3 is a view corresponding to FIG. 2 of a modified embodiment of the invention.

In FIG. 3 is shown in cross-section and schematically a modified embodiment of a fall protection device according to the invention, whereby details having a function completely corresponding to details of the embodiment according to FIGS. 1 and 2, have been given the same reference numerals as these.

Thus the actuator device according to FIG. 3 incorporates a rotatably arranged elongated spindle 16, which is provided at least along a part of its length with a screw thread, said spindle being arranged to be given a rotational motion from anelectric motor 11, via a gear 42, and wherein an actuator tube 22 is connected to a first nut 20 secured against rotation with the threaded part of the spindle, which nut is arranged in cooperation with of the threaded part the spindle, to give the actuator tube a linear motion during its rotation.

The drop protection device in this embodiment consists of a sleeve shaped member 44 provided about the spindle 16 and cooperating therewith, and having a contact surface 48 equipped with a series of evenly distributed radial V-shaped ridges projecting from the surface. The member 44 is arranged during normal rotational motion of the spindle to be carried along by this and to take part in the rotation thereof, whereas it during influence of a rapid acceleration of the rotational motion of the spindle, obtains an axial motion due to its mass inertia, which entails that its contact surface 48, in order to block the spindle against rotation, is brought into contact with a stop device 50 fixedly mounted in the actuator device, preferably with a series of projecting radial V-shaped ridges, corresponding to those in the contact surface 48.

The sleeve shaped member 44 in this case is shaped as a sleeve split into two parts along an inclined radial plane 54, with a first part 45, fitted coaxially to a part of the spindle 16, and a second part 46 fitted coaxially about the spindle and axially guided thereby. The second part 46 is pretensioned in a direction against the first part 45 to be carried along by the first part 45 during normal rotational motion of the spindle, whereas it at rapid acceleration of the spindle 16, by its mass inertia is brought to exert a counter directed force neutralizing the pretension, and thereby by relative rotation between the surfaces limiting the inclined radial plane 54, is brought to change its overall axial measure, which means that the contact surface 48 at relative rotation will be brought to engagement with the stop device 50.

In drawings and in the specification, it has been stated that the actuator device is provided with a ball nut cooperating with the screw portion of the spindle, but it of course also is possible, to use in the same manner, an actuator device equipped with a slide nut with a low degree of self-braking at a similar fall protection device.

The invention is neither for the rest limited to the embodiments shown in the drawing and described in connection thereto but modifications are possible within the scope of the following claims. The same type of fall protection device, thus can be used in a corresponding manner if the actuator device in question is intended to operate with a load suspended from it instead of a load carried as in the embodiments shown.

We claim:

1. An actuator mechanism having a drop protection device, comprising:

an elongated spindle provided with threads at least along a part of its length and rotatably arranged in a housing;

an actuator tube connected to a first nut secured against rotation with the threads of the spindle, the nut being arranged to give the actuator tube a linear motion during rotation of the spindle; and a sleeve shaped member arranged about the spindle and cooperating therewith and having a contact surface the sleeve shaped member being arranged during normal rotational motion of the spindle to be carried along by this and take part in the rotation thereof, and being arranged during influence of a rapid acceleration of the rotation of the spindle, as a result of a mass inertia of the sleeve shaped member to be given an axial motion such that the contact surface is brought into contact with a stop device fixedly mounted to the actuator device, for blocking the rotation of the spindle during the rapid acceleration.

2. An actuator mechanism as claimed in claim 1, wherein the sleeve shaped member is a second nut cooperating with a portion of the spindle threads, the second nut being arranged during normal rotational motion of the spindle to be carried along by the spindle threads to take part in the spindle rotation, and being arranged during influence of a rapid acceleration of the spindle, as a result of its mass inertia to be given a helical motion along the spindle threads, which gives an axial displacement of the second nut.

3. An actuator mechanism as claimed in claim 1, wherein the sleeve shaped member is a sleeve divided into a first and a second part along an inclined radial plane, the first part being coaxially attached to a portion of the spindle, and the second part being pretensioned in a direction towards the first part during normal rotational motion of the spindle, whereas at rapid acceleration of the spindle due to its mass inertia it is brought to exert a counter-directed force neutralizing the pretension, and thereby due to relative rotation between the surfaces limiting the inclined radial plane is brought to change its overall axial measure.

4. An actuator mechanism as claimed in claim 1, wherein the contact surface of the sleeve shaped member includes an end flank of an annular flange facing the housing and projecting from the member whereas the stop device is provided on the housing.

5. An actuator mechanism as claimed in claim 1, wherein at least one of the contact surface of the sleeve shaped member and a contact surface of the stop device includes portions arranged to increase the mutual grip between the contact surfaces in contact position.

6. An actuator mechanism as claimed in claim 5, further comprising a spring biasing the sleeve shaped member away from the stop device.

7. An actuator mechanism as claimed in claim 1, further comprising means arranged during normal operational conditions to hold the contact surface of the sleeve shaped member spaced at a distance from the stop device, said holding means being located between the sleeve shaped member and the stop device.

8. An actuator mechanism as claimed in claim 7, wherein the means for holding the contact surface of the sleeve shaped member at a distance from the stop device includes at least one spring.

9. A drop protection device for an actuator mechanism having a threaded screw and an actuator member threaded on the screw such that when the screw is rotated the actuator member moves in a linear motion, the drop protection device comprising:

a stationary stop device; and a sleeve shaped member having a mass inertia, the sleeve shaped member being mountable on and threadably engageable with the threaded screw of the actuator mechanism such that the sleeve shaped member rotates with the threaded screw during a normal rotational motion of the threaded screw and such that during a rapid rotational acceleration of the threaded screw, the mass inertia of the sleeve shaped member causes the sleeve shaped member to move axially along the threaded rod into contact with the stop device to brake rotation of the threaded screw.

* * * * *